(12) United States Patent
Lazzarin et al.

(10) Patent No.: US 9,409,633 B2
(45) Date of Patent: Aug. 9, 2016

(54) UNDERSEA PIPE-LAYING

(75) Inventors: Diego Lazzarin, Treviso (IT); Gianluca Toso, Mestre (IT); Enrico Ruaro, Povolaro di Dueville (IT)

(73) Assignee: SAIPEM S.P.A., Milan (IT)

( * ) Notice: Subject to any disclaimer, the term of this patent is extended or adjusted under 35 U.S.C. 154(b) by 102 days.

(21) Appl. No.: 13/521,773

(22) PCT Filed: Jan. 12, 2011

(86) PCT No.: PCT/EP2011/050352
§ 371 (c)(1),
(2), (4) Date: Oct. 3, 2012

(87) PCT Pub. No.: WO2011/086100
PCT Pub. Date: Jul. 21, 2011

(65) Prior Publication Data
US 2013/0034389 A1 Feb. 7, 2013

(30) Foreign Application Priority Data

Jan. 13, 2010 (GB) .................................. 1000556.9
Jun. 18, 2010 (GB) .................................. 1010305.9

(51) Int. Cl.
*B63B 35/03* (2006.01)
*F16L 1/225* (2006.01)
*F16L 1/235* (2006.01)

(52) U.S. Cl.
CPC .................. *B63B 35/03* (2013.01); *F16L 1/225* (2013.01); *F16L 1/235* (2013.01)

(58) Field of Classification Search
CPC ........... F16L 1/225; F16L 1/235; B63B 35/03
USPC .................... 405/158, 166, 167, 168.1, 168.4
See application file for complete search history.

(56) References Cited

U.S. PATENT DOCUMENTS

| 3,438,213 A | 4/1969 | Broussard et al. |
| 3,641,779 A | 2/1972 | Koop, Jr. et al. |

(Continued)

FOREIGN PATENT DOCUMENTS

| EP | 1848908 B1 | 10/2011 |
| GB | 2 011 011 A | 7/1979 |

(Continued)

OTHER PUBLICATIONS

International Search Report (PCT/ISA/210) issued on Sep. 5, 2011, by the European Patent Office as the International Searching Authority for International Application No. PCT/EP2011/050352.

(Continued)

*Primary Examiner* — Benjamin Fiorello
(74) *Attorney, Agent, or Firm* — Buchanan Ingersoll & Rooney PC

(57) ABSTRACT

A vessel for laying a pipeline includes a plurality of workstations disposed along a pipelaying path that includes an upstream portion away from a first end of the vessel and a plurality of ramps in the region of the first end of the vessel. The plurality of ramps includes a first ramp which is disposed along the pipelaying path, whose inclination is adjustable and which has a first upstream end and a second downstream end, and a second ramp which is disposed along the pipelaying path downstream of the first ramp, whose inclination is adjustable and which has a first upstream end and a second downstream end. The downstream end of the first ramp is positioned inboard of the first end of the vessel and above the bottom of the vessel and the upstream end of the second ramp is positioned inboard of the first end of the vessel and above the bottom of the vessel. An external ramp assembly is provided, including ramps and that can be pivoted relative to one another and locked in a selected position by a locking arrangement.

17 Claims, 10 Drawing Sheets

(56) References Cited

U.S. PATENT DOCUMENTS

| | | | |
|---|---|---|---|
| 3,658,222 A * | 4/1972 | Dressel et al. | 226/25 |
| RE27,420 E | 7/1972 | Rochelle et al. | |
| 3,685,305 A | 8/1972 | Lloyd, III | |
| 3,720,069 A | 3/1973 | Lockridge | |
| 3,822,559 A | 7/1974 | Matthews, Jr. et al. | |
| 3,860,122 A | 1/1975 | Cernosek | |
| 4,230,420 A | 10/1980 | Chow | |
| 4,257,718 A | 3/1981 | Rosa et al. | |
| RE30,846 E * | 1/1982 | Lang et al. | 405/168.3 |
| 4,345,855 A | 8/1982 | Uyeda et al. | |
| 4,820,082 A * | 4/1989 | Recalde | 405/168.3 |
| 5,011,333 A * | 4/1991 | Lanan | 405/166 |
| 5,413,434 A | 5/1995 | Stenfert et al. | |
| 5,527,134 A * | 6/1996 | Recalde | 405/168.3 |
| 5,533,834 A | 7/1996 | Recalde | |
| 5,580,187 A * | 12/1996 | Jordan | 405/166 |
| 5,823,172 A | 10/1998 | Suggitt | |
| 5,975,802 A | 11/1999 | Willis | |
| 6,056,478 A | 5/2000 | Martin et al. | |
| 6,213,686 B1 | 4/2001 | Baugh | |
| 6,328,502 B1 * | 12/2001 | Hickey et al. | 405/168.3 |
| 6,390,731 B1 * | 5/2002 | Van Gelder | 405/166 |
| 6,796,742 B1 | 9/2004 | Roger et al. | |
| 9,079,643 B2 | 7/2015 | Lazzarin | |
| 2002/0034423 A1 * | 3/2002 | Van Gelder | 405/166 |
| 2007/0084814 A1 * | 4/2007 | Roodenburg et al. | 212/252 |
| 2009/0324339 A1 | 12/2009 | Roodenburg et al. | |
| 2010/0080657 A1 | 4/2010 | Bianchi | |
| 2010/0086360 A1 * | 4/2010 | Signaroldi | 405/166 |
| 2010/0104371 A1 * | 4/2010 | Scaini et al. | 405/166 |
| 2010/0189513 A1 | 7/2010 | Alloggio | |
| 2011/0081204 A1 | 4/2011 | Van Grieken et al. | |

FOREIGN PATENT DOCUMENTS

| | | |
|---|---|---|
| GB | 2020391 A | 11/1979 |
| GB | 2296956 A | 7/1996 |
| GB | 2460671 A | 12/2009 |
| WO | WO 93/06401 A1 | 4/1993 |
| WO | 2005/123566 A2 | 12/2005 |
| WO | 2006/085739 A1 | 8/2006 |
| WO | 2007/000609 A2 | 1/2007 |
| WO | 2007/091884 A1 | 8/2007 |
| WO | 2007/094655 A1 | 8/2007 |
| WO | 2008/086938 A1 | 7/2008 |
| WO | WO 2008/107186 A1 | 9/2008 |
| WO | WO 2008/149210 A2 | 12/2008 |
| WO | 2009/082191 A1 | 7/2009 |
| WO | 2009/082192 A1 | 7/2009 |
| WO | 2009/087559 A1 | 7/2009 |
| WO | 2009/098586 A2 | 8/2009 |
| WO | WO 2009/148297 A1 | 12/2009 |
| WO | 2011/021935 A2 | 2/2011 |

OTHER PUBLICATIONS

Written Opinion (PCT/ISA/237) issued on Sep. 5, 2011, by the European Patent Office as the International Searching Authority for International Application No. PCT/EP2011/050352.
Notification of Transmittal of the International Search Report and the Written Opinion of the International Searching Authority, or the Declaration (PCT/ISA/220), International Search report (PCT/ISA/210) and Written Opinion of the International Searching Authority(PCT/ISA/237) issued Sep. 5, 2011, in the corresponding International Application No. PCT/EP2011/050353. (16 pages).
Search Report issued Apr. 22, 2010, by the British Patent Office in corresponding Patent Application No. GB1000556.9. (1 page).
Search Report issued Sep. 3, 2010, by the British Patent Office in corresponding Patent Application No. GB1000556.9. (2 pages).
Search Report issued Sep. 7, 2010, by the British Patent Office in corresponding Patent Application No. GB1000556.9. (1 page).
Search Report issued Sep. 3, 2010, by the British Patent Office in corresponding Patent Application No. GB1000556.9. (1 page).
Search Report issued Sep. 7, 2010, by the British Patent Office in corresponding Patent Application No. GB1000556.9 and English translation. (1 page).
Search Report issued Oct. 13, 2010, by the British Patent Office in corresponding Patent Application No. GB1010305.9. (1 page).
Office Action issued on Jul. 21, 2014, by the Patent Office of the People's Republic of China in corresponding Chinese Patent Application No. 201180009592.8, and an English Translation of the Office Action. (18 pages).
The extended European Search Report issued on Oct. 10, 2014, by the European Patent Office in corresponding European Patent Application No. 14182616.4-1754. (7 pages).

* cited by examiner

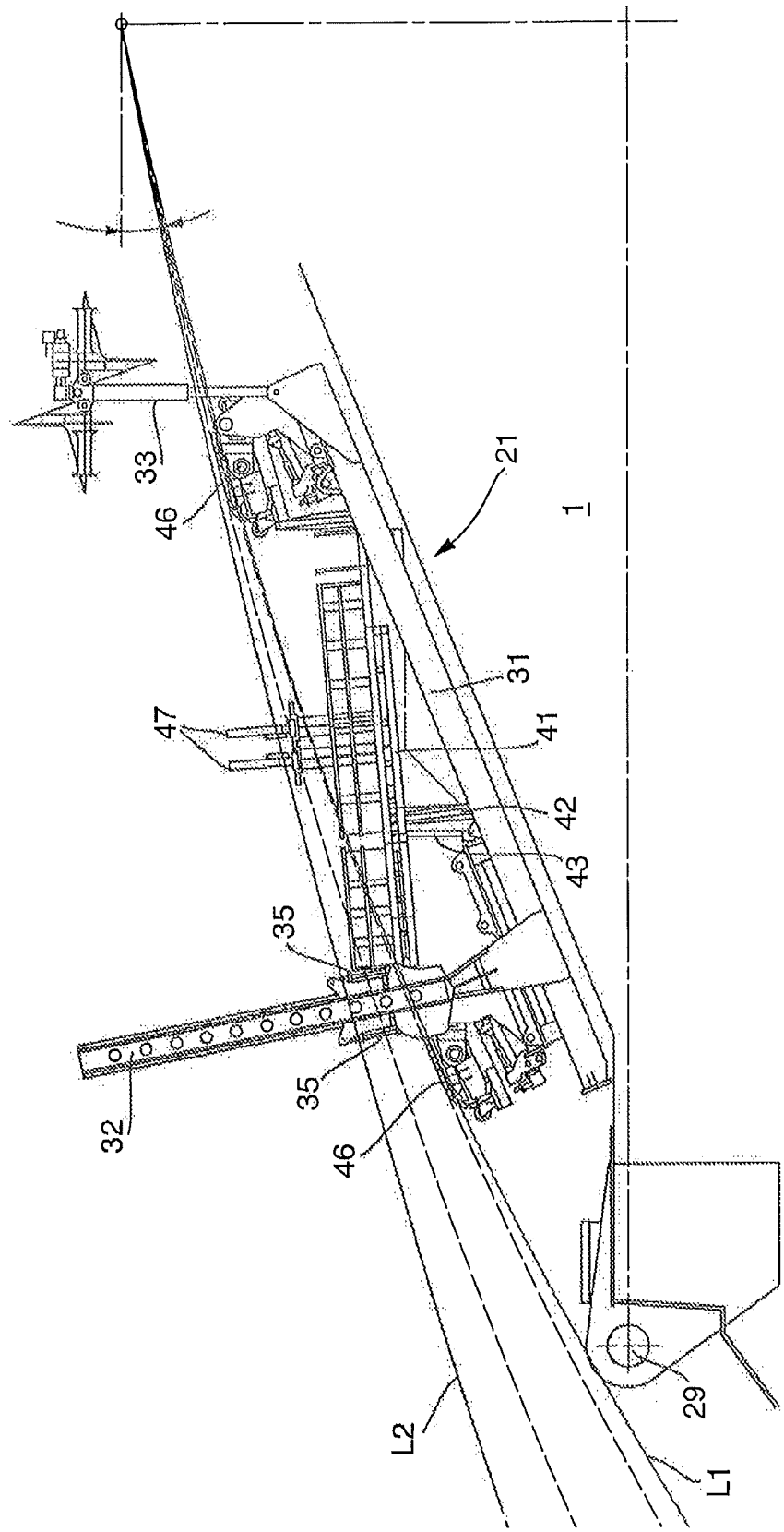

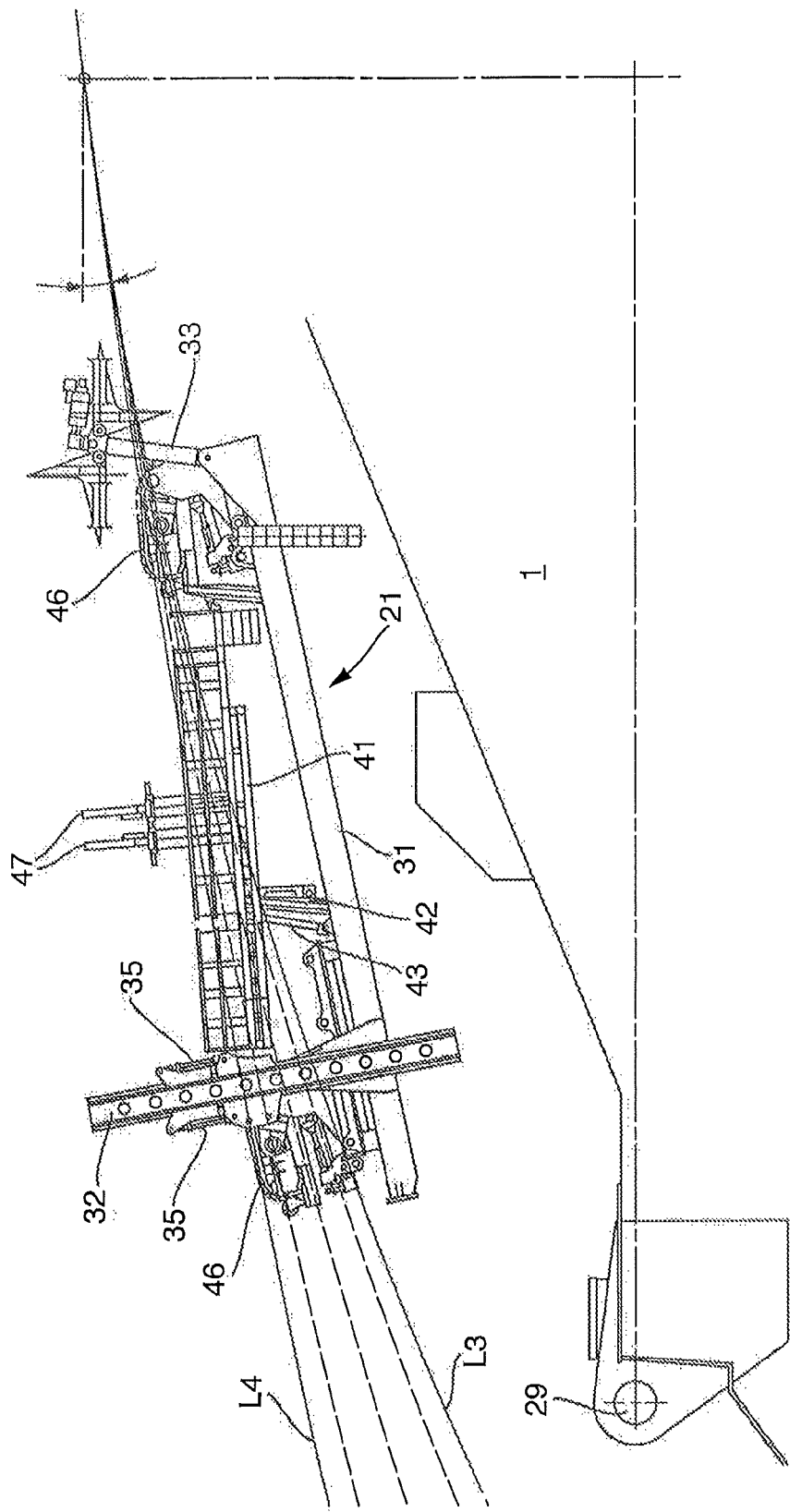

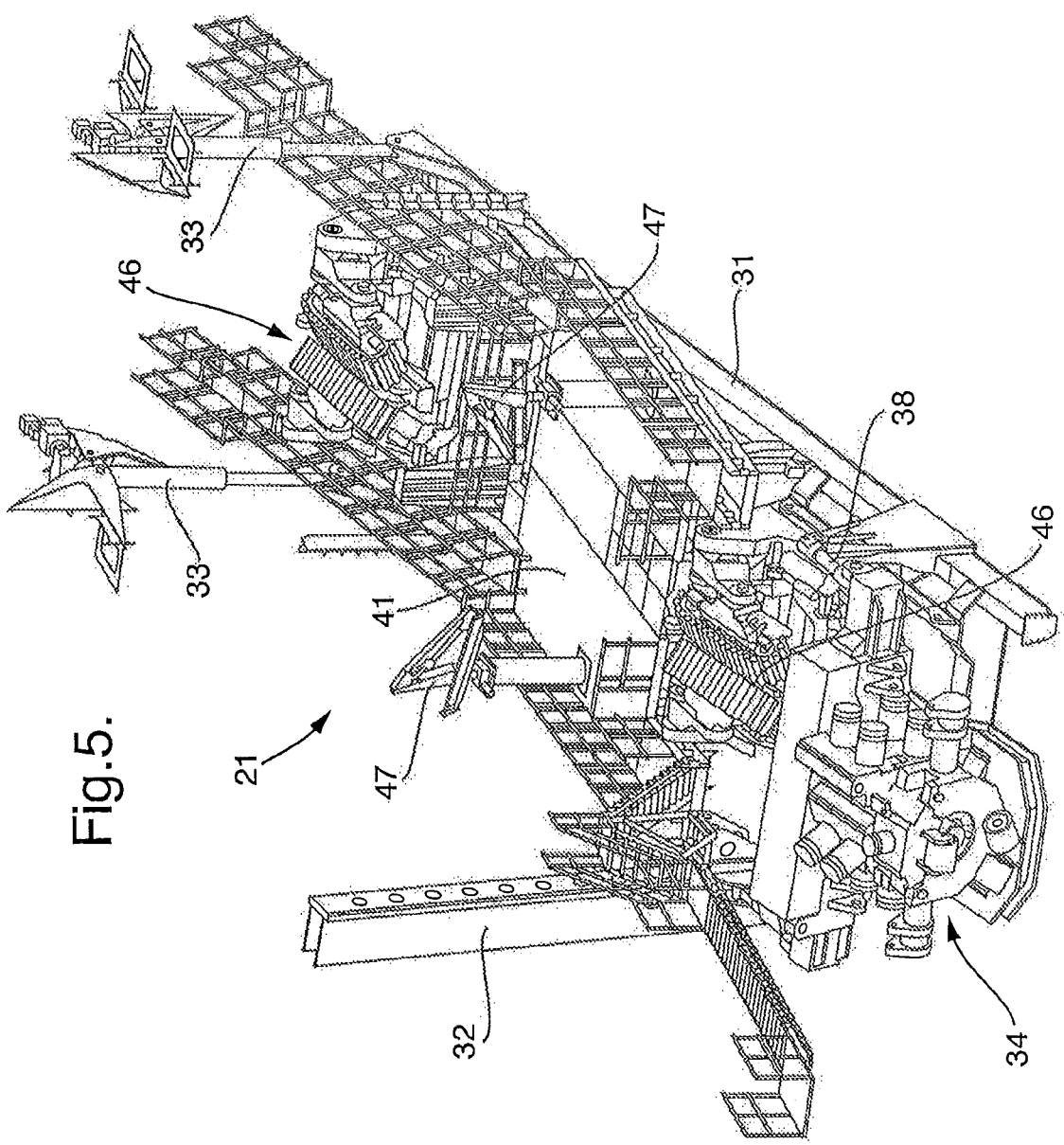

UNDERSEA PIPE-LAYING

TECHNICAL FIELD

This invention relates to a vessel for laying a pipeline at sea and to a method of laying a pipeline. The invention is concerned particularly, but not exclusively, with ramp arrangements on a pipelaying path along which the pipeline is guided.

BACKGROUND OF THE INVENTION

When laying a pipeline at sea one of two methods is commonly used: either the "S" laying method or the "J" laying method. The two methods are named in accordance with the general shape adopted by the pipeline during laying. In "S" laying, the pipeline leaves the vessel at little or no inclination to the horizontal, adopts a steeper inclination in the water and then returns to a generally horizontal disposition on the seabed. In "J" laying, the pipeline leaves the vessel at a steep or vertical inclination and the inclination steadily reduces until the pipeline is in a generally horizontal disposition on the seabed. As interest in laying pipeline in deep water has increased, so "J" laying has become more attractive because the pipeline naturally adopts a vertical or near-vertical orientation far from the seabed. "J" laying is not, however, preferred in shallower water where the natural path of the pipeline is only ever inclined at a shallow angle as it passes to the seabed and "S" laying is therefore advantageous.

"S" laying can be employed in deep water provided the pipeline being laid can be supported from the vessel until it has reached a relatively steep inclination to the horizontal. That, however, requires a considerable length of support, because the radius of bending to which the pipeline can be subjected is limited, especially in the case of large diameter pipelines.

One approach to providing an "S" laying vessel includes providing a semisubmersible vessel with twin keels. For example, U.S. Pat. No. 4,257,718 shows such an arrangement. Another approach to providing an "S" laying vessel involves providing a monohull vessel as shown, for example, in U.S. Pat. No. 5,823,712. An advantage of a twin keel semisubmersible vessel is that it can provide a relatively roll-free environment for the pipe laying and also considerable amounts of space to either side of a central pipe laying path on the vessel (also known to those skilled in the art as "the firing line"). The extra breadth of such a vessel and its relatively large draught are, however, disadvantages compared to a monohull vessel.

When laying small diameter pipes it is sometimes preferred to provide a long length of prefabricated pipeline on a reel and to lay the pipeline by unwinding the reel, but especially for large diameter pipelines it is usual to form the pipeline from discrete lengths of pipe each typically about 12 m long. In this case it is desirable to weld individual lengths of pipe into prefabricated pipe lengths (also referred to herein as "jointed pipe sections") consisting of, say, two, three or four individual lengths of pipe and then to weld the prefabricated pipe lengths to the end of the pipeline as it is being laid. Such a procedure enables the speed of laying to be increased over that which would apply if each individual pipe length were welded in turn to the end of the pipeline as it is laid. Thus the vessel is required to accommodate welding stations and other facilities for preparing prefabricated pipe lengths. Such workstations are desirably placed at intervals corresponding to one prefabricated pipe length; it is then possible to feed out the pipeline one prefabricated length at a time and each workstation can then be positioned at a respective joint between pipe lengths. The more stations that can be provided along the pipelaying path, the less work has to be done at each station and therefore the faster can be the overall rate of pipelaying.

In WO 2008/107186 a monohull vessel is described which is able to "S" lay pipelines in a particularly advantageous and flexible manner. In that vessel a pivotally mounted internal ramp is provided at the end of the pipelaying path on the vessel and guides the pipeline into the water. Optionally, an external ramp or stinger is connected to the downstream end of the internal ramp to guide the pipeline to a steeper inclination as it passes downwardly away from the vessel and towards the seabed.

When S-laying a pipeline it is common practice to provide a stinger where the pipeline leaves the vessel to control the inclination of the pipeline and the bending of the pipeline as it leaves the vessel. Such an external ramp may be pivotally mounted so that its inclination can be adjusted according to the inclination at which the pipeline is desired to leave the ramp. An actuator of some kind is connected between the vessel and a position on the external ramp downstream from its pivotal mounting, to pivot the ramp about its mounting. The desired inclination may vary according to the depth of the water in which the pipeline is being laid and the flexibility of the pipeline which in turn may be affected by the material of the pipeline and the diameter and wall thickness of the pipeline. If a long external ramp is provided, then the distal end of the ramp tends to be some distance from the vessel. Thus, it is not very practical to form the external ramp of two or more ramps because of the difficulty of controlling pivoting of the most downstream ramp at some distance from the vessel.

U.S. Re27420 describes a pipelaying vessel with a plurality of external ramps pivotally connected in series. A worm gear is provided between each pair of adjacent ramps, which controls the relative angle between the adjacent ramps. Use of a worm gear helps the ramps to maintain their relative positions even when power to the actuator driving the gear is switched off. There is, however, no system for positively locking the ramps in any relative positions.

It is an object of the invention to provide a vessel for laying a pipeline and a method of laying a pipeline which offers further advantages over the vessels and methods described above.

It is a further object of the invention to provide an external ramp assembly for laying a pipeline from a vessel, to a pipelaying vessel including such a ramp assembly and to a method of laying a pipeline using such a ramp assembly, in which one or more of the problems referred to above are overcome.

In a more particular aspect the invention seeks to provide certain improvements to and developments of the vessel that is the subject of WO 2008/107186, the disclosure of which is incorporated herein by reference, but it should be understood that the invention is also applicable to vessels of other designs.

SUMMARY OF THE INVENTION

According to a first aspect of the invention there is provided a vessel for laying a pipeline, the vessel including a plurality of workstations disposed along a pipelaying path that includes an upstream portion away from a first end of the vessel and a plurality of ramps in the region of the first end of the vessel, the plurality of ramps including a first ramp which is disposed along the pipelaying path, whose inclination is adjustable and which has a first upstream end and a second downstream end, and a second ramp which is disposed along the pipelaying path downstream of the first ramp, whose inclination is adjustable and which has a first upstream end and a second downstream end, wherein the downstream end of the first ramp is positioned inboard of the first end of the vessel and above the bottom of the vessel and the upstream end of the second ramp is positioned inboard of the first end of the vessel and above the bottom of the vessel.

By providing two adjustable internal ramps it becomes possible to achieve a greater control of the curving of the pipeline before it leaves the vessel. That enables the range of inclinations of the pipelaying path at the downstream end of the second ramp to be substantially greater than could be achieved with a single ramp. When laying in deep water a relatively steep inclination can be obtained and when laying in shallow water a much less steep inclination can be obtained. Where reference is made herein to an "internal ramp" it should be understood that this does not imply that the whole of the ramp is located within the envelope of the vessel, but only that the upstream end of the ramp is located within the envelope of the vessel. The downstream end of the ramp may always be positioned outside that envelope or may be so positioned in some, but not all, positions of the ramp. Preferably the downstream end of an internal ramp (in an embodiment described below a first internal ramp) is positioned inboard of the first end of the vessel in all working positions of the ramp. In an embodiment of the invention described below the downstream end of a second internal ramp has an upper working position in which it is above the bottom of the hull of the vessel and a lower working position in which it is below the bottom of the hull of the vessel. Also it should be understood that where reference is made in this specification to a position above the bottom of the hull or vessel or inboard of the end of the hull or vessel, it is the envelope of the hull or vessel that is being referred to; in an embodiment of the invention described below the hull advantageously is provided with an elongate recess at a stern end, but that recess does not alter the envelope of the hull and a portion of a ramp within the recess is still within the envelope of the hull. In a case where the invention is applied to a semisubmersible vessel or some other multihulled vessel, the envelope of the vessel is of course an envelope around all the hulls.

The pipelaying path may include, towards the first end of the vessel, a downstream portion that is downwardly inclined. Preferably, the upstream portion of the pipelaying path is substantially horizontal. Preferably it is also straight. Such features facilitate welding of sections of the pipeline and other working on the pipeline.

Each of the ramps may include guide elements for guiding the pipeline in use as it passes over the ramps. Such guide elements may for example comprise rollers or tracked assemblies.

In an especially preferred embodiment of the invention a workstation is provided in the region of the first ramp. That provides a challenge because the desired location of the work station changes as the position of the first internal ramp changes and/or its inclination changes. In an especially preferred embodiment of the invention, a working platform of a workstation is mounted on the first ramp for movement with the ramp and is also adjustable in position relative to the first ramp. By mounting the workstation on the first ramp, its movement naturally follows the movement of the first ramp. By making its position adjustable relative to the first ramp, it becomes possible to ensure that the position of the workstation relative to the pipelaying path is as good as it can be. Preferably the inclination of the workstation relative to the first ramp is adjustable. In such a case, when the inclination of the first ramp is increased, the inclination of the workstation relative to the ramp can be changed in the opposite direction to reduce or eliminate any change in the absolute inclination of the workstation. In that way the working platform of the workstation may be maintained in a substantially horizontal orientation. Preferably the inclination of the working platform is never more than 10 degrees to the horizontal and more preferably never more than 6 degrees to the horizontal. On the other hand the inclination of the first ramp to the horizontal may be of the order of 20 degrees. Preferably the working platform is adjustable translationally relative to the first ramp, preferably at least in an upwards and downwards direction. That enables the working platform to be positioned in use at the best position relative to the pipeline, regardless of the positioning of the first ramp and regardless of the diameter of the pipeline.

Preferably a control system is provided for controlling the adjustment of the working platform in dependence upon the adjustment of the first ramp. The control system may be partly or fully automatic. It may be arranged to reduce the change in inclination of the working platform as the inclination of the first ramp is altered or to maintain the inclination of the working platform constant, possibly at zero inclination, as the inclination of the first ramp is changed. The control system may be arranged to keep the working platform in the same position relative to the hull of the vessel; another possibility is for the control system to be arranged to keep the working platform in the same position relative to the central axis of the pipelaying path along the first ramp.

Internal or external ramps are commonly pivotally connected to a vessel hull and/or to another ramp. Such pivotal connection, however, limits the kind of adjustment of the ramp that is possible. In the present invention the first ramp is preferably mounted in such a way that its inclination can be changed and it can also be moved translationally with at least a component of the movement in a vertical direction. The vessel preferably includes a first adjusting mechanism for effecting movement of the internal ramp with at least a component of the movement in a vertical direction and a second adjusting mechanism for effecting a change of the inclination of the ramp. The ramp may be mounted on the vessel hull via struts whose length is adjustable and/or whose connection to the ramp is adjustable along the strut. The mounting on the hull may be mounting on a deck of the vessel which in turn is connected directly or indirectly to the vessel hull. In that case, and in other cases, it may be that each of the first and second adjusting mechanisms effect both a vertical movement of the ramp and a change in inclination of the ramp. For example a pair of struts may be provided at the upstream end of the first ramp and another pair of struts may be provided at the downstream end of the first ramp. One or more of the struts may include a hydraulic piston and cylinder arrangement for adjusting the length of the struts or the position of the connection of the ramp to the struts.

In an embodiment of the invention described below, the upstream end of the second ramp is not pivotally connected to the downstream end of the first ramp; in that case the upstream end of the second ramp may be pivotally connected to the hull of the vessel. It should, however, be understood that other arrangements are also possible: for example the upstream end of the second ramp may be pivotally connected to the downstream end of the first ramp. A control system may be provided to maintain the first and second ramps in appropriate relative positions.

Preferably the first ramp is mounted on the body of the vessel such that in use it can transmit tension in the pipeline through its mounting to the deck of the vessel. In the case where struts are provided, the first ramp may be mounted on a pair of struts that allow movement of the ramp in a direction along the struts but resist movement of the ramp in a direction transverse to the struts and along the pipelaying path. Such a pair of struts can transfer longitudinal forces applied by the pipeline to the ramp to the hull (or deck) of the vessel. A clamp for clamping the pipeline may be mounted on the first ramp. In that case the clamp may be required to transmit very substantial longitudinal forces from the pipeline to the ramp and those forces must then be transmitted from the ramp to the hull of the vessel.

Preferably the second ramp is adjustable between a first upper position in which a workstation is positionable on a given part of the pipelaying path alongside the second ramp and a second lower position in which the given part of the pipelaying path is submerged. It is desirable to have as many workstations as possible along the pipelaying path. In preferred embodiments of the present invention, the range of movement of the second ramp is very considerable allowing the pipelaying path to be of very different shapes and allowing a wide range of diameters of pipeline to be laid over a wide range of depths. That can result in the second ramp having an upper position in which it is useful to have a workstation in that region, but a lower position in which most of the second ramp is submerged and it is no longer possible to have a workstation in that region. In such a case, it may nevertheless be useful to provide the workstation, preferably not mounted on the second ramp. The workstation may if desired be retractable away from the pipelaying path so that when it is not in use it does not in any way impede pipelaying.

Preferably the vessel has a first mode of operation in which the pipelaying path along the vessel has a relatively small amount of curvature and leaves the vessel at a relatively shallow angle and in which the plurality of workstations include a downstream workstation which in the first mode of operation is disposed in the region where the pipeline leaves the vessel, and the vessel has a second mode of operation in which the pipelaying path along the vessel has a relatively large amount of curvature and leaves the vessel at a relatively steep angle without passing through the region where the downstream workstation is disposed. Where reference is made to a "relatively small amount" of curvature, it should be understood that this is simply a reference to an amount of curvature that is small compared to the "relatively large amount of curvature" subsequently referred to. Similarly, where reference is made to a "relatively shallow angle", it should be understood that this is simply a reference to an angle that is of small inclination compared to the "relatively steep angle" subsequently referred to. It should also be understood that in each mode the vessel may be able to operate across a range of curvatures and angles of inclination and that the ranges of the first mode of operation may overlap with the ranges of the second mode of operation.

With the preferred features referred to in the two paragraphs above, it is possible when introducing only a relatively small amount of curvature into the pipeline (with a correspondingly large radius of curvature which may be more than 300 m is preferably more than 400 m and in an embodiment described below is about 460 m), to make full use of the most downstream workstation. Such an arrangement is suitable for laying in relatively shallow water. On the other hand when introducing a relatively large amount of curvature into the pipeline (with a correspondingly small radius of curvature which may be less than 200 m is preferably less than 150 m and in an embodiment described below is about 110 m), that most downstream workstation may not be used with a consequent reduction in the speed at which pipeline can be laid. Such an arrangement is suitable for laying in relatively deep water. In an embodiment of the invention described below the most downstream workstation is a seventh workstation so the vessel operates in one mode with six workstations and in another mode with seven workstations.

Preferably the vessel has a hull and the downstream end of the first ramp and the upstream end of the second ramp are positioned inboard of the first end of the hull and above the bottom of the hull. Preferably the vessel is a monohull vessel, but it should be understood that another possibility is for the vessel to be a semisubmersible vessel or some other form of vessel with more than one hull. Preferably the vessel hull includes, on the waterline and in the region of its first end, separate portions on opposite sides of the pipelaying path. By providing portions of the hull on each side of the pipeline as it passes into the water and through the surface region of the water, especially good protection to the pipeline is provided.

The separate portions may define an enclosed moonpool but preferably they define between them a recess that is open at the first end of the vessel hull; that enhances the accessibility of the pipeline in the region where it leaves the vessel. The separate portions also preferably define between them a recess that is open at the bottom; that enables the pipeline to pass to a level below the bottom of the vessel hull before it reaches the first end of the vessel hull. The separate portions may be joined to one another above the waterline.

When a vessel is used to lay pipeline by "S" laying, the pipeline usually leaves the vessel at the stern so that the vessel moves forwards during pipelaying. Accordingly the first end of the vessel hull is preferably at the stern end.

The pipelaying path preferably begins to curve downwardly upstream of some or all of the tensioners. By introducing curvature to the pipeline early it becomes possible to have the pipeline downwardly inclined at an early stage in its path towards the first end of the vessel hull, thereby enabling the inclination of the pipeline at the first end of the vessel hull to be increased. Thus it is preferred that at least one tensioner is disposed along a portion of the pipelaying path that is inclined downwardly relative to the upstream portion of the pipelaying path, and it is more preferred that all the tensioners are disposed along portions of the pipelaying path that are inclined downwardly relative to the upstream portion of the pipelaying path.

The position of one or more of the tensioners may be adjustable along the pipelaying path. This further adds to the ability of the vessel to adapt to a wide variety of pipelaying conditions.

The present invention is particularly applicable to pipe laying arrangements in which lengths of pipeline are welded in turn to the end of the pipeline as it is laid, rather than to reel pipe laying arrangements. Accordingly, the vessel preferably further includes welding stations disposed along the pipelaying path for welding further lengths of pipeline to a pipeline being laid along the pipelaying path. The vessel also preferably includes prefabricating stations on the vessel for welding individual pipe lengths together to form lengths of pipeline, each comprising a plurality of individual pipe lengths. The prefabricating stations may be arranged to weld together two, three or four individual pipe lengths.

An advantage of the vessel according to the present invention is that it may be used for laying pipeline in both deep and shallow water. When laying pipeline in shallow water the amount of curvature introduced into the pipeline before it leaves the vessel may be deliberately less than the maximum allowed by the vessel design, but when laying pipeline in deep water it will usually be preferred to introduce as much curvature as possible. In a configuration for introducing as much curvature as possible, it is preferred that the pipelaying path enters the water at an angle inclined to the horizontal of more than 20 degrees. The maximum inclination that will be obtainable will depend upon the curvature that the pipeline can tolerate and will generally be greater for a small diameter pipeline than for a large diameter pipeline.

For some applications the first and second ramps will be all that is required to guide the pipeline. For example, the vessel is able to operate in shallow water (less than 150 m deep and even less than 50 m deep). Especially for laying in deep water (deep water being defined as a depth of more than 1,000 m) it may be desirable to connect one or more external ramps to the first and second ramps to allow the pipeline to be supported until it reaches a steeper inclination. Thus, the vessel may further include an external ramp which defines a part of the pipelaying path and which is connected at an upstream end to the downstream end of the second ramp. For operation in even deeper water, the vessel may further include a further external ramp which defines a part of the pipelaying path and which is pivotally connected at one, upstream, end to the downstream end of the first-mentioned external ramp. One or more actuators, for example hydraulic piston and cylinder arrangements may be provided for controlling the pivoting of the one or more external ramps. A locking arrangement may be provided for locking the one or more external ramps in a plurality of orientations.

The pipelaying path preferably includes a curved portion extending from the straight, substantially horizontal, upstream portion of the pipelaying path to the downstream portion of the pipelaying path. The invention may be applied to laying of a pipeline of any of a wide variety of diameters.

In conventional vessels for "S" laying, curvature is first introduced into the pipeline close to the stern of the vessel with much of the bending of the pipeline taking place aft of the vessel. Preferred embodiments of the present invention enable that initial bending to take place much earlier and close to the centre of the vessel.

According to the first aspect of the invention there is also provided a method of laying a pipeline from a vessel, in which the pipeline is guided towards a first end of the vessel along a path along which a plurality of workstations are disposed, the pipeline being guided over a plurality of ramps in the region of the first end of the vessel, the plurality of ramps including a first ramp which is disposed along the pipelaying path, whose inclination is adjustable and which has a first upstream end and a second downstream end, and a second ramp which is disposed along the pipelaying path downstream of the first ramp, whose inclination is adjustable and which has a first upstream end and a second downstream end, wherein the downstream end of the first ramp is positioned inboard of the first end of the vessel and above the bottom of the vessel and the upstream end of the second ramp is positioned inboard of the first end of the vessel and above the bottom of the vessel.

The vessel may be in any of the forms defined above.

Preferably, a working platform of a workstation is adjustably mounted on the first ramp and is moved relative to the first ramp when the inclination of the first ramp is altered to reduce the change in inclination of the working platform.

In the description of the vessel and method above, one preferred form of vessel has been described. This vessel incorporates several features which are not only inventive and advantageous in combination but also inventive and advantageous when used alone or in other combinations. For example, the feature that there is an external ramp assembly including first and second ramps that can be adjusted relative to one another and can be locked in a chosen position is a feature that may be usefully employed on a different form of pipelaying vessel. Thus, according to a second aspect of the invention, there is provided an external ramp assembly for laying a pipeline from a vessel, the external ramp assembly including a first ramp, a second ramp downstream of the first ramp, the orientation of the second ramp relative to the first ramp being adjustable, an actuator connected between the first ramp and the second ramp for adjusting the orientation of the second ramp relative to the first ramp, and a locking arrangement for locking the ramps in a plurality of relative orientations.

By providing a locking arrangement for locking the ramps in a plurality of relative orientations, it becomes possible to provide an external ramp assembly whose configuration can be changed and yet can be locked in each of the selected configurations, enabling it then to behave like a non-adjustable external ramp assembly.

Whilst it is within the scope of the invention for the ramps to be able to be locked in any relative orientation within a given continuous range, it is preferred that the ramps are able to be locked in any of a number of discrete relative orientations. Usually, it will be preferred for the ramps to be lockable in four or more discrete relative orientations. By providing such discrete locking positions it becomes more economical to provide a system for reliable locking.

Where reference is made in this specification to an "external" ramp assembly, it should be understood that the ramp assembly is "external" in the sense that in normal use it lies predominantly or entirely outside the envelope of the vessel hull. It is within the scope of the invention for a part, preferably a minor part, of the first ramp to be located within the envelope of the vessel.

Preferably the second ramp is pivotally connected to the first ramp but it should be understood that other arrangements may be adopted for allowing the angle of the second ramp to the first ramp to be adjusted.

The angle of the ramp assembly relative to the vessel is also preferably adjustable. That may be achieved by pivotally mounting the upstream end of the ramp on the vessel or on a ramp extending from the vessel. One or more struts may then be connected to the first or second ramp for raising or lowering the ramp assembly.

The first and second ramps are preferably connected by a linkage of adjustable length. The actuator is preferably arranged to act directly on the linkage and to alter the length of the linkage, but it is also possible for the actuator not to be directly connected to any part of the linkage, so that the function of actuation to change the relative orientation of the ramps and the function of locking are entirely separate. The locking arrangement may be arranged to fix the length of the linkage at a selected one of a plurality of lengths. Preferably there are either a pair of linkages symmetrically located on opposite sides of the pipelaying path and operated in unison, or more preferably a single linkage disposed vertically above or below, preferably below, the pipelaying path.

The actuator preferably includes at least one hydraulically actuable assembly. That assembly is preferably arranged for adjusting the length of the linkage, but, as indicated above, may be entirely separate from the linkage. Hydraulic actuation is simple and powerful, and the provision of the locking arrangement is especially advantageous in the case of hydraulic actuation because, once the ramps are locked in position relative to one another, the hydraulic pressure can be released.

The ramp assembly is preferably connected to the vessel at a proximal end. The vessel preferably provides the only support for the ramp assembly; preferably the distal end of the ramp assembly, which may be the distal end of the second ramp is a free end.

The linkage preferably comprises members slidable relative to one another to adjust the length of the linkage. The members preferably engage telescopically. In an embodiment of the invention described below, a male member is telescopically engaged in a female member. The locking arrangement is preferably arranged to lock the members against such sliding movement; in the embodiment described below formations that are connected to the members are brought into engagement with one another to lock the members against relative movement. Thus the locking arrangement may include interengageable formations which are movable between interengaging positions for locking the ramps in a given orientation and disengaged positions for allowing the relative orientation of the ramps to be altered. In the embodiment described below, the formations are brought into engagement by relative movement in a direction transverse to the direction of telescoping movement of the members. The interengaging formations may be generally in the form of toothed formations. The formations preferably include abutting faces that are inclined at more than 45 degrees and preferably more than 70 degrees to the direction of relative sliding movement of the members of the linkage. The relative movement of the formations may be hydraulically actuated. Preferably, a pair of locking arrangements are provided on opposite sides of the telescopically engaging members.

If desired a further external ramp may be provided, downstream of the second ramp, the orientation of the further external ramp relative to the second ramp being adjustable. One or more yet further ramps may also sometimes be provided.

The first and second ramps preferably include guide members for guiding the pipeline over the ramps. The guide members may include guide rollers. If desired, the positions of the guide members may be adjustable to adjust the path of the pipeline relative to the ramps.

The range of adjustment of the ramp assembly preferably allows the approximate bending radius of the path of the pipeline as it passes over the ramps to be less than 200 m, and more preferably about 150 m or less than 150 m. In an embodiment of the invention described below the bending radius can be adjusted to a minimum of about 100 m. Also the range of adjustment of the ramp assembly preferably allows the approximate bending radius of the path of the pipeline as it passes over the ramps to be more than 250 m, more preferably about 300 m or more and even more preferably more than 350 m. In an embodiment of the invention described below the bending radius can be adjusted to a maximum of about 400 m. Thus the adjustability of the ramps can allow for the pipeline to be guided over a wide range of curvatures as it leaves the vessel.

According to the invention there is also provided a pipelaying vessel including an external ramp assembly as defined above.

The vessel is preferably capable of S-laying a pipeline. An external ramp assembly of the invention is of particular value when S-laying because the pipeline often leaves the vessel at a relatively shallow angle of inclination (to the horizontal) and, especially in deep water, may be required to bend to a steep angle of inclination. The vessel may also be capable of J-laying a pipeline.

The vessel may include a further ramp immediately upstream of the external ramp assembly. The inclination of the further ramp may be adjustable. The upstream end of the first ramp may be pivotally connected to the downstream end of the further ramp.

According to the invention there is also provided a method of laying a pipeline from a vessel, the method including the following steps:

providing an external ramp assembly including a first ramp, a second ramp downstream of the first ramp, the orientation of the second ramp relative to the first ramp being adjustable, an actuator connected between the first ramp and the second ramp for adjusting the orientation of the second ramp relative to the first ramp, and a locking arrangement for locking the ramps in a plurality of relative orientations;

laying a pipeline from the vessel with the pipeline passing over and being guided by the external ramp assembly with the first and second ramps locked in a first relative orientation;

unlocking the locking arrangement;

adjusting the orientation of the second ramp relative to the first ramp from the first relative orientation to a second relative orientation by operation of the actuator;

locking the first and second ramps in the second orientation; and laying the pipeline from the vessel with the pipeline passing over and being guided by the external ramp assembly with the first and second ramps locked in the second relative orientation.

An especially preferred feature of the invention is that the vessel may continue to lay the pipeline with the pipeline passing over and being guided by the external ramp assembly while the first and second ramps are adjusted from the first relative orientation to the second relative orientation. Usually it would be necessary to abandon a pipeline before adjusting an external ramp assembly because of the heavy loads imposed on the ramp assembly by the tension in the pipeline while it is being laid. In a preferred embodiment of the present invention, however, the second ramp can be pivoted relative to the first ramp with the pipeline still in position on the ramp assembly and imposing large loads on it.

In the method of the invention it is preferred that the orientation of the second ramp relative to the first ramp is adjusted by one or more hydraulic jacks and, when the first and second ramps are locked in the second orientation, the hydraulic pressure in the one or more hydraulic jacks is released. It is of considerable practical advantage to be able to take the step of releasing the hydraulic pressure in the hydraulic jacks and not to have to rely on the hydraulic fluid to keep the ramps in the desired relative orientation.

It will be appreciated that the ramp assembly, vessel and method of the invention as described herein are closely related and that therefore essential or preferred features of one may, unless indicated otherwise or clearly inappropriate, be incorporated into the other. Any aspect of the method of the invention may use any form of the apparatus of the invention. More particularly the method of laying a pipeline according to the invention may use any form of ramp assembly described above. Similarly, an apparatus of the invention may be so configured as to be suitable for use in a method according to any form of the invention. Thus, features described above in respect of the ramp assembly or vessel of the invention may be incorporated into the method of the invention and vice versa.

BRIEF DESCRIPTION OF THE DRAWINGS

By way of example embodiments of the invention will now be described with reference to the accompanying schematic drawings, of which:

FIG. 3A is a side view of the further adjustable internal ramp assembly in a first position suitable for operation with six workstations, FIG. 3B is a side view of the further adjustable internal ramp assembly in a second position suitable for operation with seven workstations, FIG. 5 is an isometric view of the further adjustable internal ramp assembly with some additional parts shown and some parts omitted.

DETAILED DESCRIPTION OF EMBODIMENTS

Figure 1:
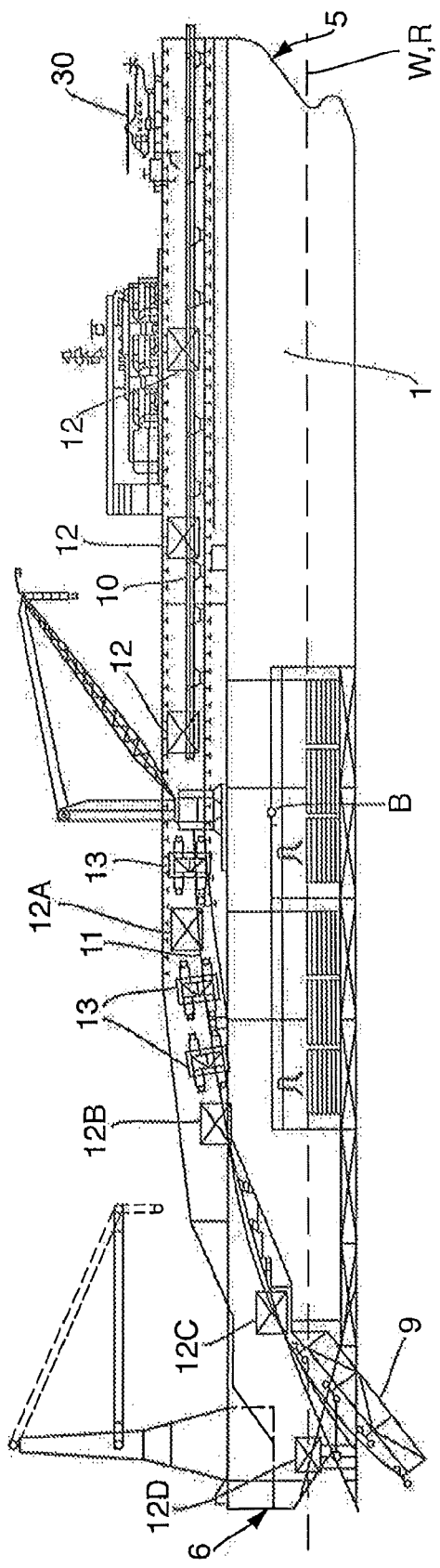
FIG. 1 is a partly sectional side view of a monohull vessel for laying a pipeline, the vessel including a single adjustable internal ramp assembly and not embodying the invention

FIG. 1 is the same drawing as shown in WO 2008/107186 and reference can be had to that publication for further details of that vessel. Since, however, embodiments of the invention described below comprise modifications of the vessel shown in the drawings of WO 2008/107186 it is convenient to describe briefly the vessel shown in that publication.

The vessel generally comprises a vessel hull 1, within which are defined a plurality of prefabricated decks for the prefabrication of jointed pipe sections from individual lengths of pipe and on which cranes and other facilities are provided. The bow 5 of the hull 1 is shown on the right hand side and the stern 6 of the hull 1 is shown on the left hand side, as viewed in FIG. 1.

The vessel hull 1 is of unconventional design at its stern end, having starboard and port end portions between which an elongate recess is defined. The recess is open at the stern end of the hull 1 and is also open downwardly (into the sea), but it may be closed over the top by a deck. In FIG. 1, an internal ramp 9 is shown pivotally connected to the hull of the vessel and is disposed in the protected stern area defined by the elongate recess at the stern end of the hull.

The barycentre B (centre of gravity) of the vessel is marked in FIG. 1, which also shows the water line W (the level of the sea when the vessel is at its working draught). The rolling axis R (the axis about which the vessel naturally rolls) is coincident with the waterline W.

Along the length of the middle of the vessel a pipe laying path (firing line) is defined. Ramps are provided along the path: at the upstream end (the right hand end as seen in FIG. 1) of the path, there is a horizontal, straight, fixed ramp 10; following that there is a curved, fixed, ramp 11 which extends between the fixed ramp 10 and the internal ramp 9. Thus the pipe laying path has an upstream horizontal section along the ramp 10 and leading to a curved section 11 that is of constant, fixed, curvature and which in turn leads to the downstream section along the internal ramp 9. The inclination of the ramp 9 relative to the vessel hull 1 can be adjusted and the ramp 9 is also provided with rollers which can be moved in a plane transverse to the pipelaying path to alter the curvature of the ramp 9. Thus at one extreme (suitable for laying in relatively shallow water), the portion of the pipe laying path along the internal ramp 9 may have only a small amount of curvature and the downward inclination of the path may be only slightly greater at the downstream end of the internal ramp 9 than at the downstream end of the curved ramp 11; at the other extreme (suitable for laying in relatively deep water) the pipe laying path along the internal ramp 9 may have a greater amount of curvature so that the downward inclination of the pipe laying path at the downstream end of the internal ramp 9 is substantially greater than the downward inclination of the path at the downstream end of the curved ramp 11. In FIG. 1, the ramp 9 is shown pivoted to a position suitable for substantially increasing the downward inclination of the pipe laying path.

Working stations in the form of welding stations 12 are provided along the fixed ramp 10 for welding new jointed sections of pipe to the end of the pipeline being laid. The active length of the horizontal, straight, portion of the pipelaying path extends from a distance corresponding to one jointed section of pipe upstream of the most upstream welding station 12 (the one furthest to the right in FIG. 1) to the upstream end of the curved ramp 11. The extended length of the horizontal, straight, portion of the pipelaying path extends further to the right (as seen in FIG. 1) to a location below the helicopter 30 shown in FIG. 1. Tensioners 13, of which three are shown in FIG. 1, are provided along the curved ramp 11 for tensioning the pipeline downstream of the tensioners. The precise form of the welding stations and tensioners is not relevant to the present invention and thus may take any known form. It may be noted that in FIG. 1 the tensioners 13 are shown as crawler track tensioners, but it should be understood that they may take other forms.

Downstream of the tensioners 13, the tension in the pipeline will cause it to follow the curvature of the ramps 11 and 9 so that only rollers below the pipeline are required. Upstream of one or more of the tensioners 13, however, where the pipelaying path first becomes curved that tension is hardly present and it may therefore be desirable to provide pressure rollers (not shown) above the pipeline to apply downward pressure onto the pipeline and cause it to follow the path defined by the curved ramp 11. Such pressure rollers can also assist in causing the pipeline to follow the path defined by the curved ramp 11 during abandonment/recovery operations.

In use of the vessel to lay a pipeline, the vessel is driven in a forwards direction by its propulsion system and, as is conventional for "S" laying of a pipeline, a considerable forward thrust is maintained, even when the vessel is not moving forwards, to balance the rearward force exerted on the vessel by the tension in the pipeline. The vessel is preferably equipped with a dynamic positioning system to maintain its desired position at all times. The pipeline is passed rearwardly over the vessel along the pipe laying path with the tensioners 13 controlling the passage of the pipeline. As the end of the pipeline moves along the horizontal fixed ramp 10, new jointed sections of pipe are welded to the end of the pipeline. As the pipeline reaches the curved ramp 11, the pressure rollers above the pipeline cause the pipeline to curve downwardly following the path of the curved ramp 11 and passing through the tensioners 13. The tension in the pipeline increases as it passes through the tensioners 13 reaching full tension after the last tensioner. The pipeline moves away from the vessel hull 1 as it passes from the curved ramp 11 onto the internal ramp 9 and, soon after passing onto the internal ramp 9 enters the water. As can be seen from FIG. 1, the point of entry of the pipeline into the water is within the protected stern area defined by the elongate recess in that area. The pipeline then passes to the end of the internal ramp 9, leaves the internal ramp 9 and passes down to the seabed. Usually, the forward thrust maintained by the vessel will be such that the pipeline is substantially straight and tangential to the end of the curved path defined by the ramp 9 in the region immediately downstream of the internal ramp 9 before then reducing in inclination as it approaches the seabed. In that way any sharp curvature at the end of the internal ramp 9 is avoided.

If the vessel is required to operate in deep water, then it may be desirable to add a further ramp and/or stinger downstream of the internal ramp 9 in order to provide further controlled curvature to the pipeline. In this specification, there is no particular distinction made between the use of the terms "ramp" and "stinger" and thus no particular construction of any further ramp is implied by choosing to call it a "ramp" rather than a "stinger".

Figure 2:
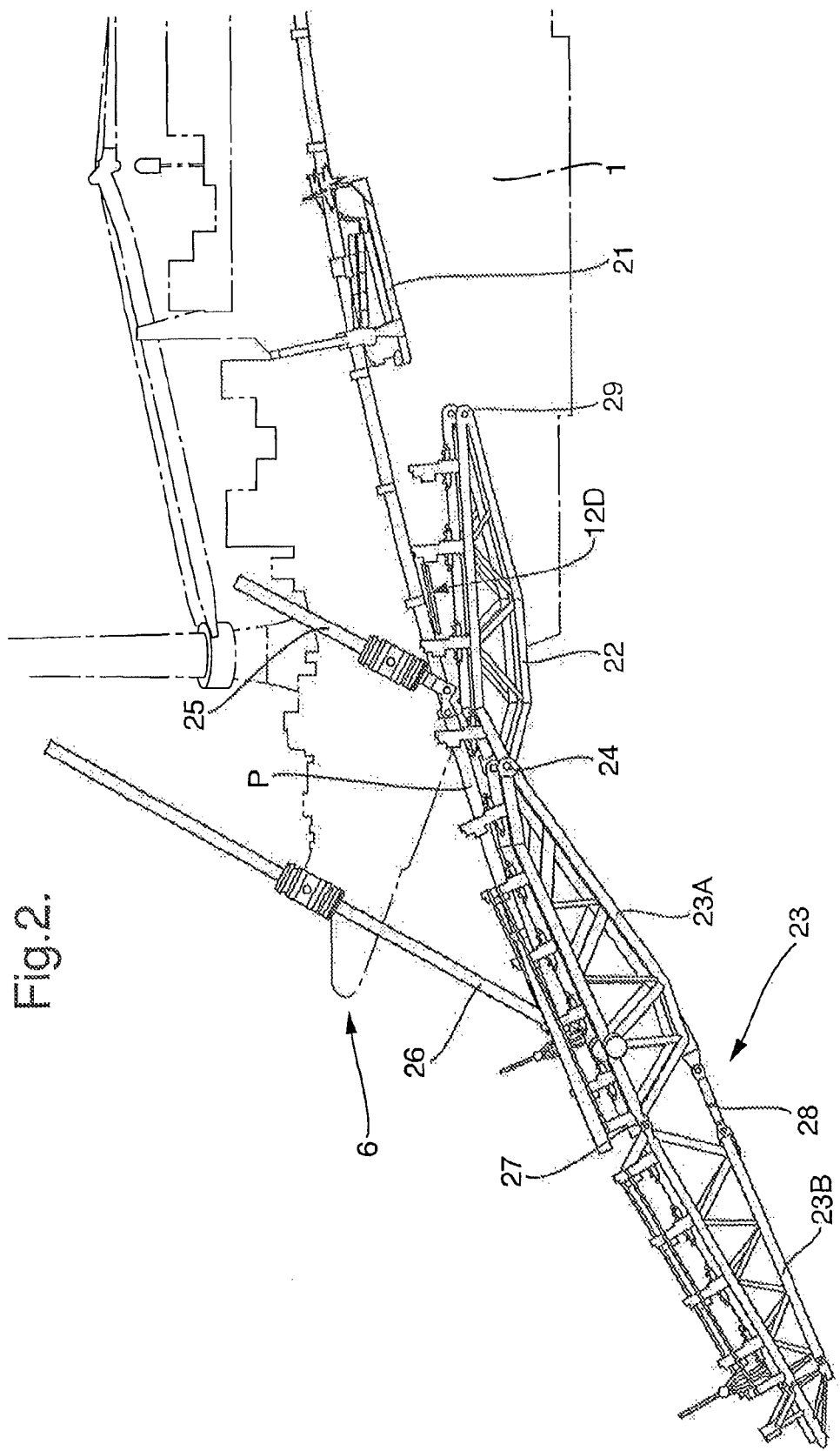
FIG. 2 is a partly sectional side view of the vessel of FIG. 1 modified according to an embodiment of the invention by the provision of a further adjustable internal ramp assembly upstream of another internal ramp assembly, the modified vessel also having an external ramp (stinger)

FIG. 2 shows the stern end of the vessel already described with reference to FIG. 1 but modified in accordance with the invention. The principal modification is the provision of another adjustable internal ramp upstream of the ramp 9 of the vessel of FIG. 1, resulting in a vessel that has a first internal adjustable ramp 21 and a second internal adjustable ramp 22.

In FIG. 2, a stinger 23 is shown connected to the downstream end of the second ramp 22. The upstream end of the stinger 23 is pivotally connected at 24 to the downstream end of the second ramp 22 which in turn is pivotally connected at 29 to the hull of the vessel. A pair of hydraulic rams 25 are pivotally connected to the ramp 22 towards its downstream end to enable the second ramp 22 to be pivoted relative to the vessel hull 1. Similarly, a pair of hydraulic rams 26 are pivotally connected to the stinger 23 partway along its length to allow the stinger to be pivoted about its pivoted connection to the second ramp 22.

The stinger 23 shown in FIG. 2 is made up of two portions 23A and 23B that are pivotally connected together at their tops at a connection 27 and connected at their bottoms by a pair of fixed links 28. In that mode the stinger operates as a single external ramp. It is, however, possible to replace the links 28 by a pair of hydraulic rams and, by actuating those rams, pivot the downstream portion 23B of the stinger relative to the upstream portion 23A.

The ramps 21 and 22 and the stinger 23 are provided with guide elements in the form of sets of rollers and/or tracked assemblies which guide a pipeline being laid from the vessel. The guide elements are adjustably mounted on the ramps 21, 22 and optionally also on the stinger 23, with appropriate hydraulic actuators (not shown) so as to define the desired curvature to the path of the pipeline as it passes over the guide elements.

Referring now to FIG. 3A to FIG. 5, some further details of the ramp 21 and the assembly of which it forms a part can be seen. The ramp 21 has a main frame 31 which is suspended at its downstream end by a pair of robust extensible struts 32, and at its upstream end by a pair of less robust struts 33 (one of the struts 32 being omitted from FIG. 5). The struts 33 comprise screw jacks that are pivotally connected at a lower end to the frame 31 and pivotally connected at the upper end to the vessel hull. The purpose of the struts 33 is to adjust the vertical position of the upstream end of the first ramp 21. They do not resist movement of the ramp 21 along the pipelaying path. The struts 32 on the other hand allow movement of the frame 31 along them but are rigidly connected to the vessel at their top ends. The position of the frame 31 along these struts is adjustable by operation of a pair of hydraulic rams 35 and is lockable in a given selected position. Such jacking systems are known per se. The pair of struts 32 not only withstand the vertical load imposed by the weight of the ramp 21 and the transverse load imposed by the tension in the pipeline as it passes over the ramp on a curved path, but are also able if necessary to accommodate the loads imposed by a fixed clamp 34 which may be mounted on the ramp 21 and is shown in FIG. 5 only.

In normal operation the fixed clamp 34 is not operated and no longitudinal load is transmitted from the clamp 34 to the ramp 21, but in some circumstances it will be desirable to hold the tension in the pipeline by the fixed clamp 34 (for example to allow the pipeline upstream of the clamp 34 to be cut). In this case the clamp 34 is clamped to the pipeline and the longitudinal load then exerted on the clamp 34 (which load is likely to be more than 100 tonnes and may be more than 500 tonnes) transmitted to the frame 31 of the ramp 21 via a pair of hydraulic rams 38, one of which is referenced in FIG. 5. The load from the rams 38 are transmitted to respective ones of the struts 32 which then transmit the longitudinal load through the struts to the frame 31. As will be understood, the fixed clamp moves with the downstream end of the ramp 21 and, as a result may move in a vertical plane perpendicular to the pipelaying path a distance of 4 m or more.

The structure of the internal clamp may be of a kind known per se. One suitable form of clamp is described in our British Patent Application No 0909425.1, the description of which is incorporated herein by reference.

Figure 4A:
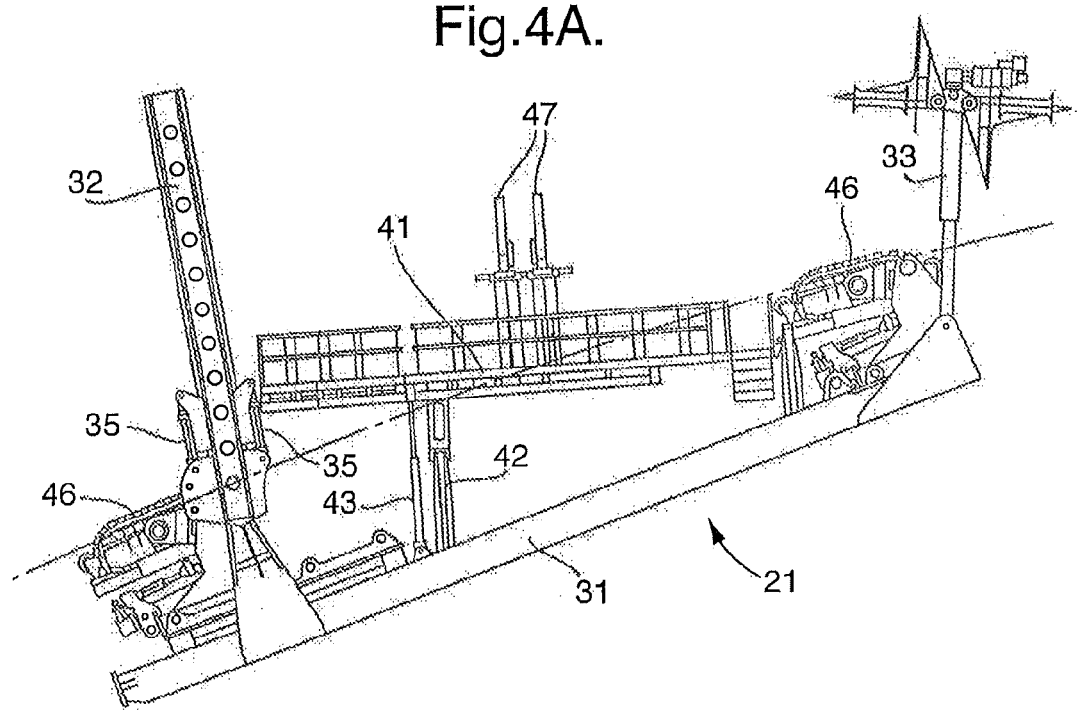
FIG. 4A is a side view of the further adjustable internal ramp assembly with a working platform in a first position, elevated relative to the ramp assembly.
Figure 4B:
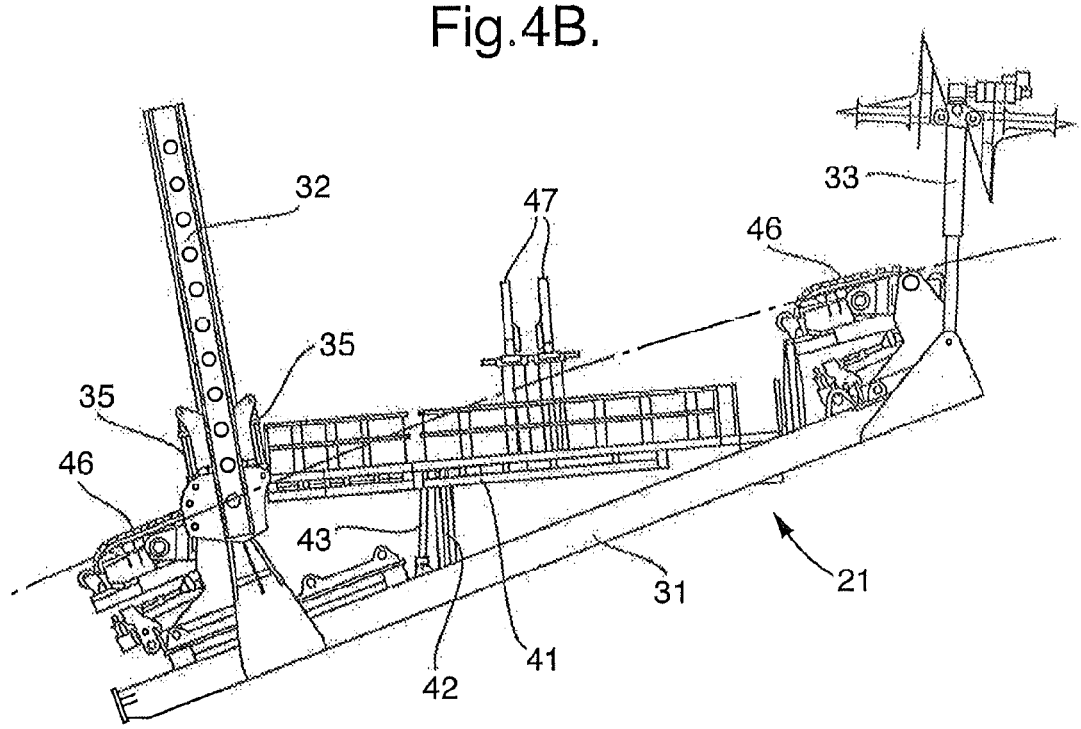
FIG. 4B is a side view of the further adjustable internal ramp assembly with a working platform in a second lower position relative to the ramp assembly.

The ramp assembly incorporating the ramp 21 is also provided with a working platform 41 which is adjustably mounted on the ramp. A pair of hydraulically operated linkages 42 and a pair of hydraulic rams 43 downstream of the linkages 42 are provided to effect the adjustment. By adjusting the linkages 42 and the rams 43, it will be seen that the height of the platform 41 and also its inclination relative to the ramp 21 can be adjusted as desired. In FIGS. 4A and 4B the platform is shown in upper and lower horizontal positions respectively. As will be understood the terms "upper" and "lower" in the previous sentence refer to the position of the platform relative to the ramp 21. In the drawings the platform 41 is shown fitted with a pair of load handling arms 47, but it will be understood that a wide variety of equipment can be provided on the platform.

The vessel is provided with a control system which is able to control the operation of the linkages 42 and the rams 43, automatically or semi-automatically to keep the working platform 41 in its desired position when the ramp 21 is moved. The control system is integrated with the system for controlling movement of the ramp 21 and in a preferred embodiment of the invention the same control system controls movement of the ramp 22 and the stinger 23 as well as any sets of guide elements on the ramps and stinger that are adjustable to control the curvature of the pipeline. In this respect it may be noted that in FIG. 5, tracked assemblies 46 are provided at opposite ends of the ramp 21 for guiding the pipeline.

Referring again to FIG. 1, reference has already been made to the three welding stations referenced 12. Also shown in FIG. 1 are three further working stations referenced 12A, 12B and 12C. It can be seen that the pivotal connection 29 is in the region of the working station 12C, which is the sixth working station. In the embodiment of the invention described, there is yet another welding station 12D, downstream of the station 12C. As shown in FIG. 1 the working station is displaced vertically above the ramp 9 and is apparently useless, but FIG. 1 shows the ramp 9 at a relatively steep inclination. At a more shallow inclination of the ramp 9, the working station 12D is positioned in the region of the ramp 9 and can be used to carry out further work on the pipeline. The provision of this seventh working station, when it can be used, is useful in enabling the work on the pipeline to be distributed between one more station and therefore the time for which the pipeline has to be stationary at the working stations can be reduced. In FIG. 2, the position of the seventh working station 12D is again marked.

In the description above, dimensions of the vessel and of the pipelaying path are not mentioned. The particular arrangement chosen for any particular vessel will depend on many circumstances, including the envisaged use of the vessel. For a vessel embodying the invention and especially well suited to laying triple lengths of pipe, each of 36 m length (12 m per individual pipe length), a particularly advantageous set of ranges of parameters is as follows:
Length of vessel hull 1: 260 m to 330 m
Breadth of vessel hull 1: 35 m to 45 m
Radius of curvature of curved ramp 11: 300 m to 310 m As will now be understood the vessel has two modes of operation. In one mode (referred to elsewhere in the specification as the second mode), illustrated in FIG. 3A, but not in FIG. 3B, a relatively large amount of curvature is introduced into the pipeline, as is required when laying the pipeline in relatively deep water. In this mode, the final (seventh) work station 12D is not used. In another mode, (referred to elsewhere in the specification as the first mode), illustrated in FIG. 3B, but not FIG. 3A, a relatively small amount of curvature is introduced into the pipeline, as is required when laying the pipeline in relatively shallow water. In this mode the final (seventh) work station is used.

The different positions of the ramp 21 in the two modes can readily be appreciated by comparing FIGS. 3A and 3B. It can be seen that the ramp 21 is higher, relative to the vessel hull 1, in FIG. 3B than in FIG. 3A and that the inclination of the ramp 21 is less in FIG. 3B than in FIG. 3A. In each case, however, the working platform 41 is adjusted to an approximately horizontal position.

In FIG. 3A, curved solid lines L1 and L2 show approximate extremes of the path of the bottom of the pipeline P for laying in the first mode with six work stations. In the case of line L1 the radius of curvature of the pipeline as it passes over the ramp 21 is 110 m (the smallest radius of curvature corresponding to the greatest amount of curvature) and in the case of line L2 the radius of curvature of the pipeline as it passes over the ramp 21 is 300 m. Similarly in FIG. 3B, curved solid lines L3 and L4 show approximate extremes of the path of the bottom of the pipeline P for laying in the mode with seven work stations. In the case of line L3 the radius of curvature of the pipeline as it passes over the ramp 21 is 130 m and in the case of line L4 the radius of curvature is 460 m (the greatest radius of curvature corresponding to the least amount of curvature).

Figure 6:
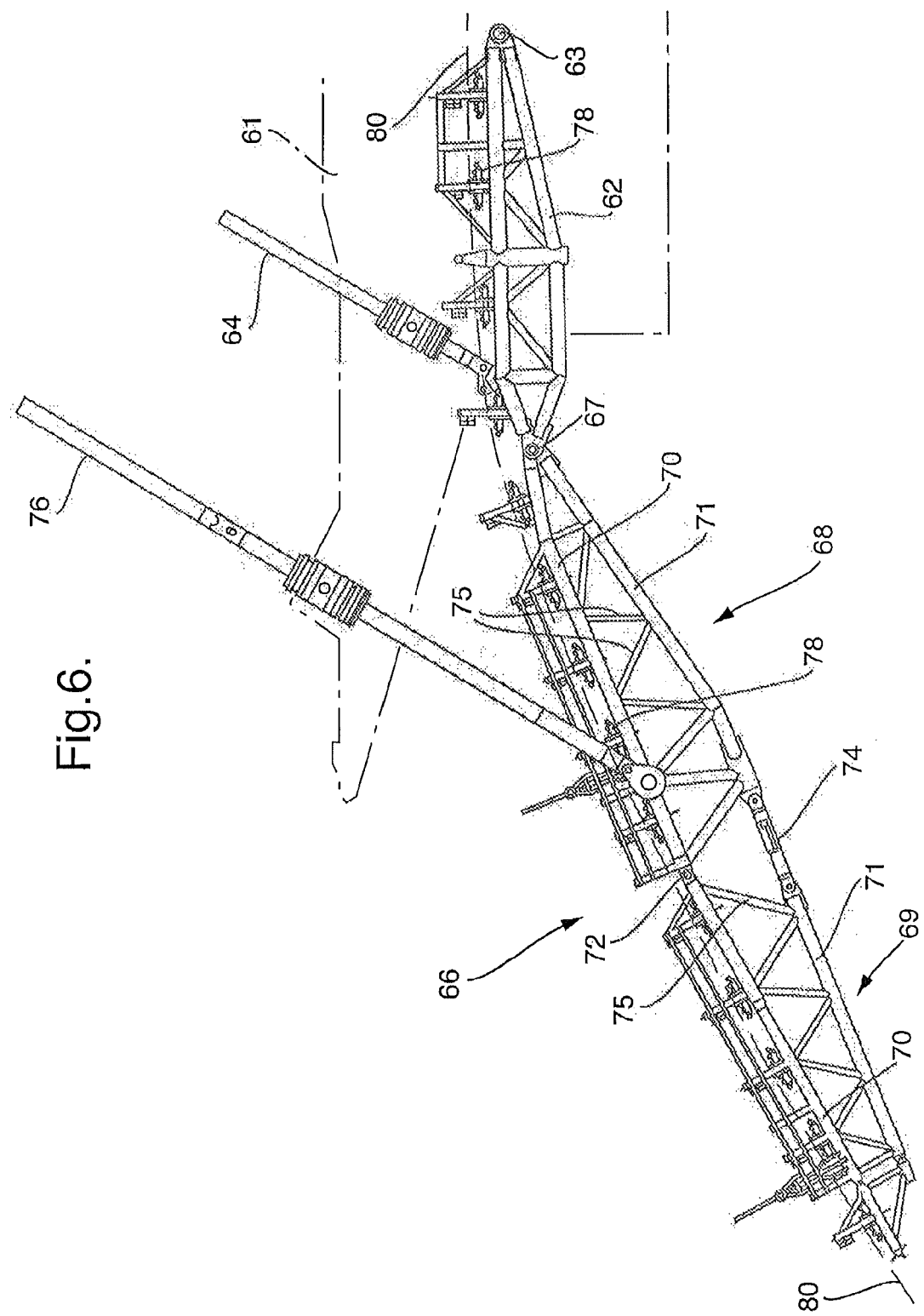
FIG. 6 is a side view of an external ramp assembly supported from a pipelaying vessel.

FIG. 6, shows in dotted outline the stern portion of a hull 61 of the pipelaying vessel already described with reference to FIG. 1.

At the stern of the vessel a ramp 62 is provided for guiding a pipeline as it leaves the vessel. In the example shown the ramp 62 is pivotally mounted at its upstream end 63 and the inclination of the ramp 62 can be adjusted by raising or lowering, relative to the vessel hull 61, a pair of connecting struts 64 (only one of which is visible in FIG. 6) to cause pivoting movement of the ramp 62.

Figure 7:
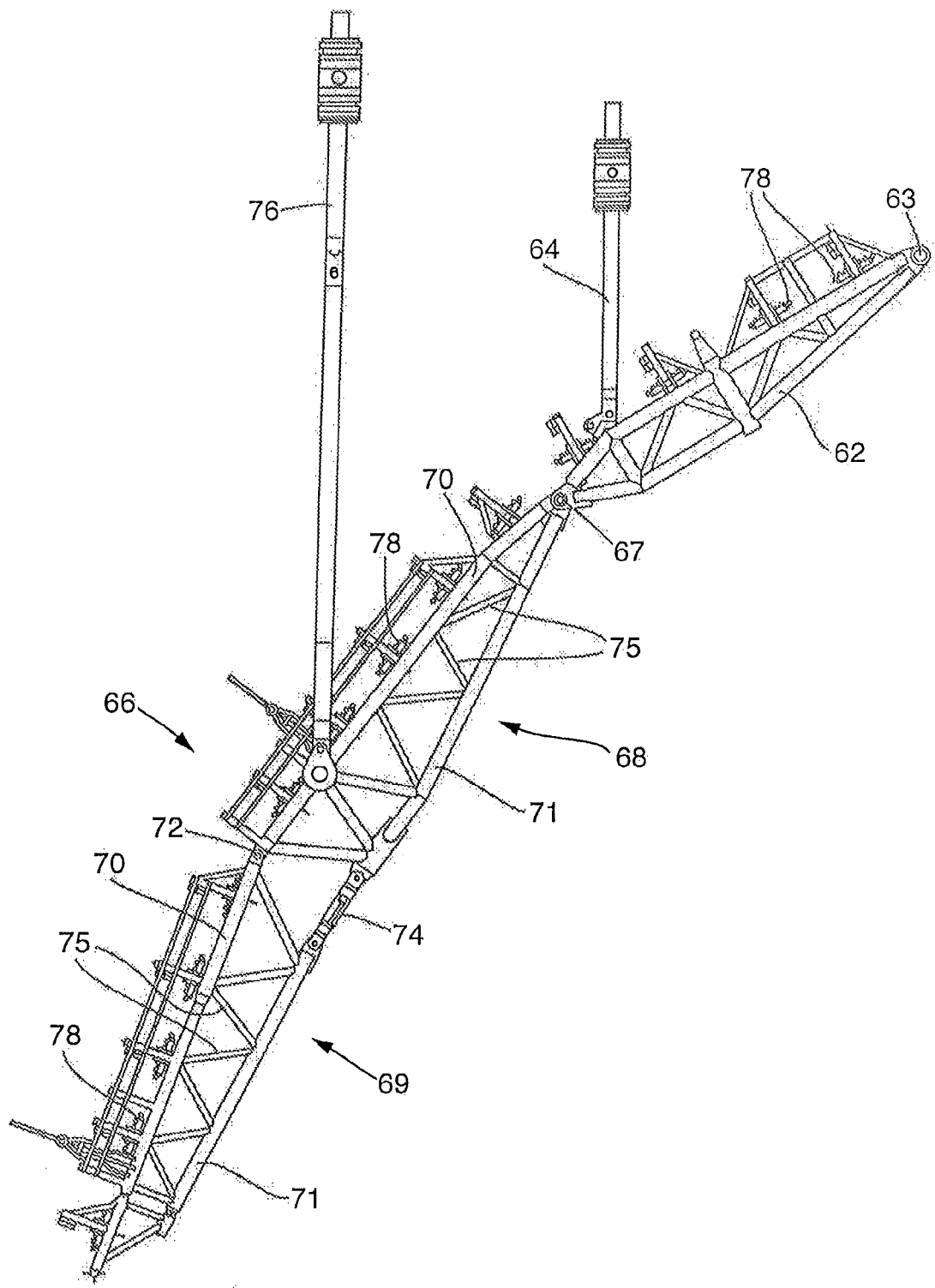
FIG. 7 is an enlarged view of the external ramp assembly shown in FIG. 1.
Figure 8:
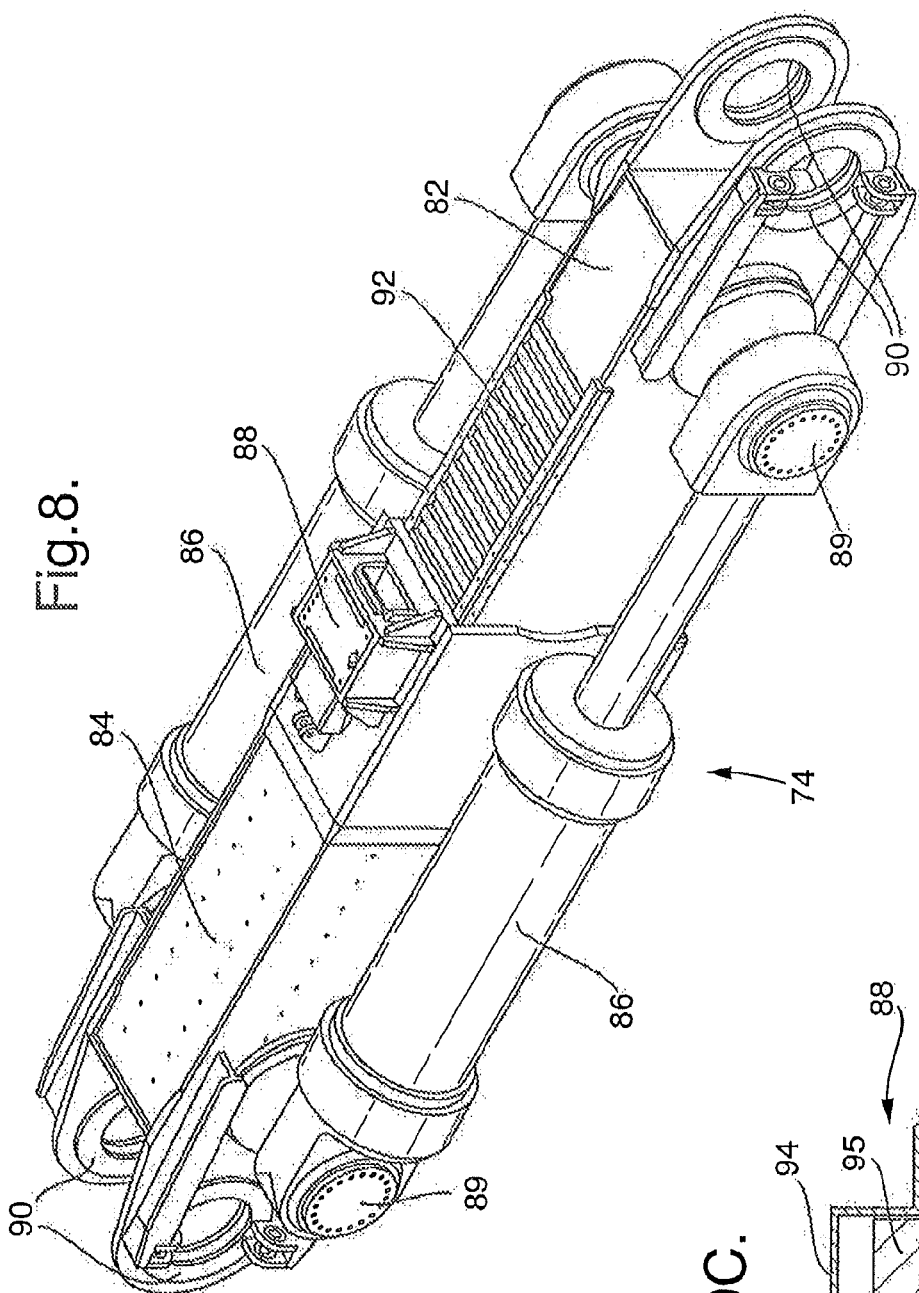
FIG. 8 is an isometric view of a linkage between first and second ramps of the external ramp assembly, the linkage being shown in an extended condition.

Referring now also to FIG. 7, an external ramp assembly 66 is pivotally connected to the downstream end 67 of the ramp 62 and extends to a free end. The external ramp assembly includes a first ramp 68 and a second ramp 69. Each of the first and second ramps has a framework structure, the framework including a pair of upper longitudinal members 70 (only one of which is visible in FIG. 6) on opposite sides of the ramp, a lower longitudinal member 71 along the bottom of each ramp and frame members 75 extending between the members 70 and 71 to provide a strong framework. The upper longitudinal members 70 of the ramps 68 and 69 are pivotally connected together at connections 72 and their lower longitudinal members 71 are connected together by a linkage 74 of adjustable length. As can readily be seen from FIG. 6, adjusting the length of the linkage 74 causes the ramps 68 and 69 to pivot relative to one another.

The inclination of the ramp 68 can be adjusted by raising or lowering, relative to the vessel hull 61, a pair of connecting struts 76 (only one of which is visible in FIG. 6) to cause pivoting movement of the ramp 68 relative to the ramp 62.

The ramps are each provided with sets of guide rollers 78 over which a pipeline is guided when in use the vessel is laying a pipeline. The guide rollers may be in fixed positions on the ramps or their positions may be adjustable to provide a further facility for adjusting the path along which the pipeline travels as it is being laid. In FIG. 6 a dotted line 80 shows the path along which the pipeline passes.

The purpose of the ramps 68 and 69 is to guide the pipeline to a chosen inclination as it leaves the downstream end of the ramp 69. In different conditions that inclination is often different. In this described embodiment of the present invention, the provision of the linkage 74 enables the relative orientation of the ramps 68 and 69 to be adjusted relative to one another by adjusting the length of that linkage to cause pivoting of the ramps relative to one another about their pivotal connections 72.

In FIG. 6, the ramp assembly is shown in a position for introducing only a very small amount of curvature into the pipeline as it is laid, as may be appropriate when laying the pipeline in relatively shallow water; in FIG. 7, the ramp assembly is shown in a position for introducing a large amount of curvature into the pipeline as it is laid, as may be appropriate when laying the pipeline in relatively deep water.

Referring now to FIGS. 8, and 9A to 9C, the linkage 74 is a telescopic linkage and generally comprises a male beam 82, a female beam 84 within which one end of the male beam 82 is received, a pair of hydraulic jacks 86 and a pair of locking arrangements 88. Each of the male and female beams have a pair of padeyes 90 at opposite ends of the linkage. The linkage is pivotally connected through those pad eyes to the lower longitudinal members 71 of the ramps 68 and 69.

The ends of the hydraulic jacks 86 are connected to laterally projecting supports 89 on the male beam 82 and the female beam 84. Thus as will readily be understood, when the jacks 86 are operated in unison, the male beam 82 slides within the female beam 84 and the length of the linkage 74 and the separation of the supports 89 is adjusted, causing pivoting of the ramp 69 relative to the ramp 68 about the pivotal connections 72. The jacks 86 have a range of travel between a fully contracted condition shown in FIG. 9A where the linkage is fully telescoped and a condition shown in FIG. 9B where the linkage is fully extended.

Figure 9C:
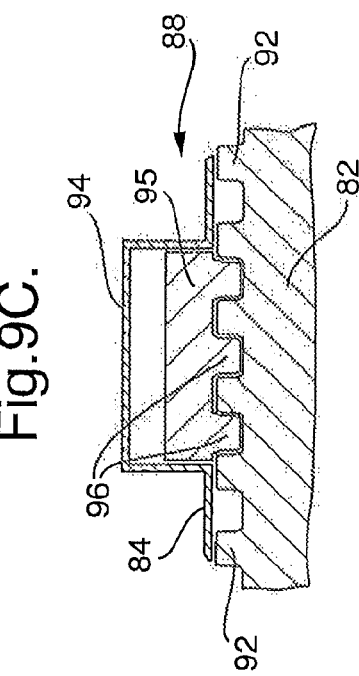
FIG. 9C is diagrammatic sectional view of a locking arrangement for the linkage.
Figure 9A:
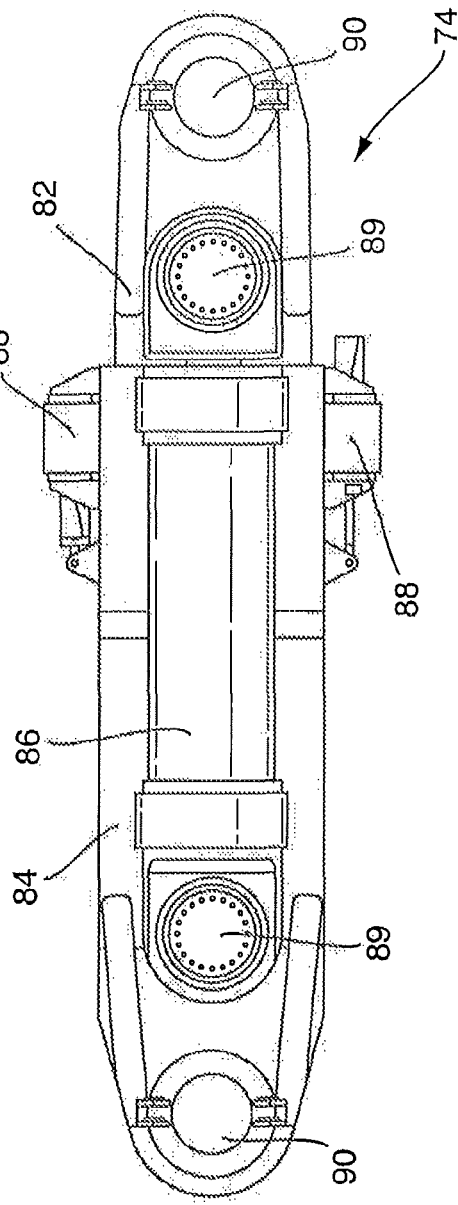
FIG. 9A is a side view of the linkage in a retracted condition.
Figure 9B:
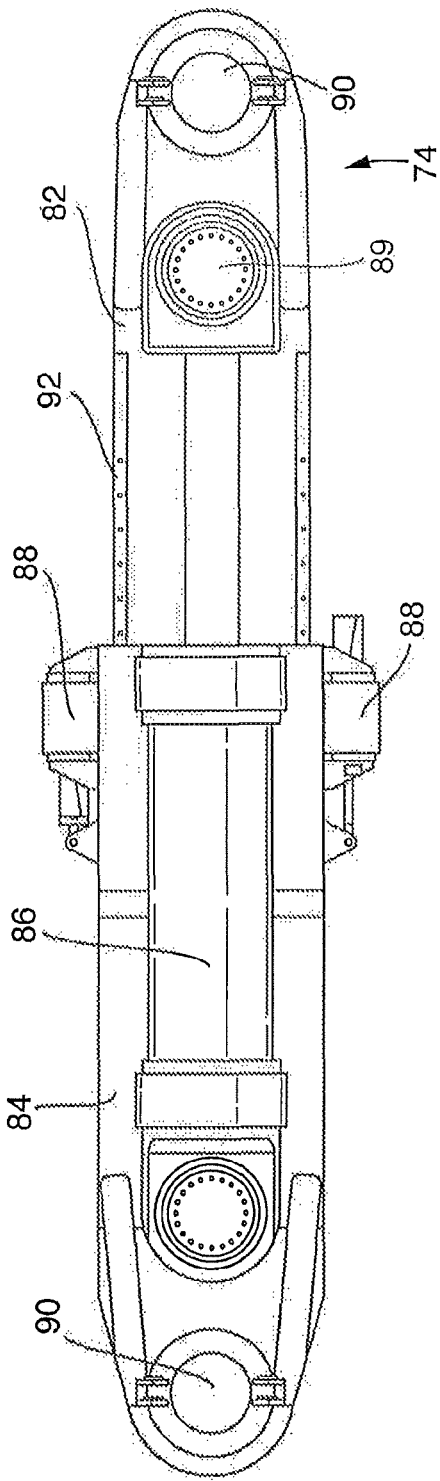
FIG. 9B is a side view of the linkage in an extended condition.

The locking arrangements 88 are each of the same design and are provided on the upper and lower sides of the beams 84 and 86. Whilst both arrangements can be seen in outline in FIGS. 9A and 9B, only the top arrangement is visible in FIG. 8 and FIG. 9C and it will now be described. The upper face of the male beam 82 that is received within the female beam 84 is provided with a series of transverse teeth 92. Inside the female beam 84 at the top thereof, within a housing 94, a hydraulically actuated locking pad 95 is provided with corresponding transverse teeth 96 (FIG. 9C). The locking pad 95 is hydraulically operated to move between a retracted position, not shown in FIG. 9C, in which the teeth on the locking pad are disengaged from the teeth 92 on the male beam 82 so that they do not affect the freedom of the male beam 82 to slide within the female beam 84, and an extended condition, shown in FIG. 9C, in which the teeth 96 on the locking pad 95 engage the teeth 92 on the male beam 82 so that they lock the male beam 82 at a particular position within the female beam 84. As will now be understood, since a plurality of interengageable transverse teeth are provided, the beams can be locked in a plurality of different discrete positions between the fully extended and fully retracted positions of the beams, by the locking pad 95 just described and the similar locking pad that engages the underside of the male beam. One or more sensors (not shown) are preferably provided to detect the position of the male beam 82 within the female beam 84; feedback from the sensor(s) can be used to control the operation of the jacks 86 to extend the linkage to the required length.

In operation, the ramp 62 can be pivoted relative to the vessel hull 61 by raising or lowering the struts 64. Also the ramp 68 can be pivoted relative to the ramp 62 by raising or lowering the struts 76. The ramp 69 can be pivoted relative to the ramp 68 by retracting the locking pads 95 and then operating the hydraulic jacks 86 to alter the length of the linkage 74 and cause the ramp 69 to pivot about the pivotal connections 72 relative to the ramp 68. Once the linkage 74 has been adjusted to the desired length, the locking pads 95 are extended to lock the linkage via the interengaging teeth 92 and 96 on the top and bottom of the male beam 82 and the female beam 84. It is then possible to release the hydraulic pressure in the jacks 86.

As will be understood the pivoting of all the ramps is about a horizontal axis perpendicular to the pipelaying path.

In the description above, one particular example has been described, but it should be understood that many other variations and modifications are also possible. For example, the external ramp assembly may be further lengthened by adding another ramp which may be connected to the ramp 69 in the same manner as the ramp 69 is connected to the ramp 68. Even more ramps can similarly be added if desired. Also, whilst in the embodiment described the struts 76 are connected to the ramp 68, it is alternatively possible for them to be connected to the ramp 69.

A vessel of the kind described above with reference to the drawings is able to conduct effective pipe-laying operations with a wide variety of sizes of pipe and in both shallow and deep water, with especially deep laying being possible with smaller diameter pipe. Furthermore the vessel is able to operate in very shallow water. Also, the location of the internal ramps within the protected stern area makes the vessel suitable for operation in the subarctic and arctic zones.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A vessel for laying a pipeline, the vessel comprising:
   a plurality of workstations disposed along a pipelaying path that includes an upstream portion away from a first end of the vessel wherein the plurality of workstations includes welding stations disposed along the pipelaying path for welding further lengths of pipeline to a pipeline being laid along the pipelaying path, and
   a plurality of ramps in the region of the first end of the vessel, the plurality of ramps including:
   a first ramp disposed along the pipelaying path, whose inclination is adjustable and which has a first upstream end and a second downstream end wherein the first ramp is mounted in such a way that its inclination can be changed and it can also be moved translationally with at least a component of the movement in a vertical direction, and
   a second ramp disposed along the pipelaying path downstream of the first ramp, whose inclination is adjustable and which has a first upstream end and a second downstream end, wherein the downstream end of the first ramp is positioned inboard of the first end of the vessel and above the bottom of the vessel and the upstream end of the second ramp is positioned inboard of the first end of the vessel and above the bottom of the vessel, and
   wherein the plurality of workstations includes welding stations disposed along the pipelaying path for welding further lengths of pipeline to a pipeline being laid along the pipelaying path.

2. A vessel according to claim 1, in which a working platform of one of the plurality of workstations is mounted on the first ramp for movement with the ramp and is also adjustable in position relative to the first ramp.

3. A vessel according to claim 1, comprising:
   a first adjusting mechanism for effecting movement of the first ramp with at least a component of the movement in a vertical direction and a second adjusting mechanism for effecting a change in the inclination of the first ramp.

4. A vessel according to claim 1, in which the first ramp is mounted on the body of the vessel such that in use it can transmit tension in the pipeline through its mounting to the deck of the vessel.

5. A vessel according to claim 1, in which a clamp for clamping the pipeline is mounted on the first ramp.

6. A vessel according to claim 1, in which the second ramp is adjustable between a first upper position in which one of the plurality of workstations is positionable on a given part of the pipelaying path alongside the second ramp and a second lower position in which the given part of the pipelaying path is submerged.

7. A vessel according to claim 1, in which the vessel has a first mode of operation in which the pipelaying path along the vessel has a first amount of curvature and leaves the vessel at a first angle and in which the plurality of workstations include a downstream workstation which in the first mode of operation is disposed in the region where the pipeline leaves the vessel, and the vessel has a second mode of operation in which the pipelaying path along the vessel has a second amount of curvature greater than the first amount of curvature and leaves the vessel at a second angle greater than the first angle without passing through the region where the downstream workstation is disposed.

8. A vessel according to claim 1, in which the vessel has a hull and the downstream end of the first ramp and the upstream end of the second ramp are positioned inboard of the first end of the hull and above the bottom of the hull.

9. A vessel according to claim 8, in which the vessel is a monohull vessel.

10. A vessel according to claim 9, in which the vessel hull includes, on the waterline and in the region of its first end, separate portions on opposite sides of the pipelaying path.

11. A vessel according to claim 10, in which the separate portions define between them on the waterline a recess that is open at the first end of the vessel hull.

12. A vessel according to claim 1, in which at least one tensioner is disposed along a portion of the pipelaying path upstream of the first internal ramp.

13. A vessel according to claim 1, in which, in at least one configuration of the vessel, the pipelaying path enters the sea at an angle inclined to the horizontal of more than 20 degrees.

14. A vessel according to claim 1, further including at least one external ramp which defines a part of the pipelaying path and which is connected at one, upstream, end to the downstream end of the second internal ramp.

15. A method of laying a pipeline from a vessel, comprising:
   laying the pipeline from the vessel as claimed in claim 1.

16. A method of laying a pipeline from a vessel, the method comprising:
   guiding the pipeline towards a first end of the vessel along a pipelaying path along which a plurality of workstations are disposed wherein the plurality of workstations includes welding stations disposed along the pipelaying path for welding further lengths of pipeline to a pipeline being laid along the pipelaying path;
   guiding the pipeline over a plurality of ramps in the region of the first end of the vessel, the plurality of ramps including a first ramp disposed along the pipelaying path, whose inclination is adjustable and which has a first upstream end and a second downstream end wherein the first ramp is mounted in such a way that its inclination can be changed and it can also be moved translationally with at least a component of the movement in a vertical direction, and a second ramp disposed along the pipelaying path downstream of the first ramp, whose inclination is adjustable and which has a first upstream end and a second downstream end,
   wherein the downstream end of the first ramp is positioned inboard of the first end of the vessel and above the bottom of the vessel and the upstream end of the second ramp is positioned inboard of the first end of the vessel and above the bottom of the vessel.

17. A method according to claim 16, in which a working platform of a workstation is adjustably mounted on the first ramp and is moved relative to the first ramp when the inclination of the first ramp is altered to reduce the change in inclination of the working platform.

\* \* \* \* \*